United States Patent
Kim et al.

(10) Patent No.: US 7,357,998 B2
(45) Date of Patent: Apr. 15, 2008

(54) DISK SUBSTRATE FOR A PERPENDICULAR MAGNETIC RECORDING MEDIUM, PERPENDICULAR MAGNETIC RECORDING DISK AND MANUFACTURING METHODS THEREOF

(75) Inventors: Kong Kim, Tokyo (JP); Junichi Horikawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 295 days.

(21) Appl. No.: 10/758,035

(22) Filed: Jan. 16, 2004

(65) Prior Publication Data

US 2004/0146686 A1   Jul. 29, 2004

(30) Foreign Application Priority Data

Jan. 20, 2003   (JP) .............................. 2003-010921

(51) Int. Cl.
  *G11B 9/00* (2006.01)
  *G11B 5/66* (2006.01)
  *G11B 23/00* (2006.01)
  *B05D 3/02* (2006.01)

(52) U.S. Cl. ................ 428/846.2; 428/828; 428/833.2; 427/131; 360/136

(58) Field of Classification Search ................ 428/827, 428/831.2, 835, 835.1, 835.4, 848.2, 848.3, 428/840.1, 845.5, 828, 833.2, 846.2; 360/134, 360/135, 136; 369/283; 427/131; 204/192.15, 204/192.2

See application file for complete search history.

(56) References Cited

U.S. PATENT DOCUMENTS

| | | | | |
|---|---|---|---|---|
| 4,778,582 A | * | 10/1988 | Howard | 204/192.15 |
| 5,723,198 A | * | 3/1998 | Hosoe et al. | 428/828.1 |
| 5,851,643 A | * | 12/1998 | Honda et al. | 428/828 |
| 6,403,203 B2 | * | 6/2002 | Futamoto et al. | 428/840.1 |
| 6,511,761 B1 | * | 1/2003 | Tanahashi et al. | 428/832.2 |
| 6,579,634 B2 | * | 6/2003 | Saito | 428/845.5 |
| 2002/0186506 A1 | * | 12/2002 | Sato et al. | 360/135 |
| 2003/0099867 A1 | * | 5/2003 | Nishikawa et al. | 428/840.1 |

FOREIGN PATENT DOCUMENTS

JP   2001-143245 A   5/2001

OTHER PUBLICATIONS

Translation JP 2001143245.*

* cited by examiner

*Primary Examiner*—Carol Chaney
*Assistant Examiner*—Louis Falasco
(74) *Attorney, Agent, or Firm*—Sughrue Mion, PLLC

(57) ABSTRACT

A disk substrate for a perpendicular magnetic recording medium comprises a disk base member, a soft magnetic layer formed on the disk base member, and a protection layer formed on the soft magnetic layer. The soft magnetic layer and the protection layer are deposited by sputtering. A perpendicular magnetic recording disk comprises the above-mentioned disk substrate and at least a perpendicular magnetic recording layer formed thereon. The perpendicular magnetic recording layer is deposited on the disk substrate by sputtering after the disk substrate is heated.

6 Claims, 1 Drawing Sheet

DISK SUBSTRATE FOR A PERPENDICULAR MAGNETIC RECORDING MEDIUM, PERPENDICULAR MAGNETIC RECORDING DISK AND MANUFACTURING METHODS THEREOF

This application claims priority to prior application JP 2003-10921, the disclosure of which is incorporated herein by reference.

BACKGROUND OF THE INVENTION

This invention relates to a perpendicular magnetic recording disk to be mounted in a HDD (hard disk drive) of a perpendicular magnetic recording system, a disk substrate for a perpendicular magnetic recording medium, which is for use in manufacturing the perpendicular magnetic recording disk, and methods of manufacturing the perpendicular magnetic recording disk and the disk substrate for a perpendicular magnetic recording medium.

Recently, rapid advancement of the information society requires information recording apparatus or devices having a much higher information recording capacity. For example, in a magnetic recording apparatus such as a HDD (hard disk drive), an information recording capacity exceeding 60 Gbyte is required for a 2.5-inch magnetic disk.

For the purpose of complying with such requirement, it is necessary to realize the information recording density exceeding 100 Gbit per one square inch (100 $Gbit/inch^2$) in the magnetic disk. In order to perform stable recording/reproducing operations at such high recording density, it is preferable to use a perpendicular magnetic recording system as a magnetic recording/reproducing system.

In order to obtain a magnetic disk adapted to the perpendicular magnetic recording system (which will hereinafter be called a "perpendicular magnetic recording disk"), it is required to adopt a design concept drastically different from a magnetic disk for the in-plane magnetic recording system which is widely used at present.

For example, a substrate and a recording medium adapted to the perpendicular magnetic recording system are proposed in Japanese Patent Application Publication (JP-A) No. 2001-143245.

The perpendicular magnetic recording disk is structured as a double-layer perpendicular magnetic recording medium in which a magnetic underlayer comprising a soft magnetic layer and a perpendicular magnetic recording layer comprising a hard magnetic layer are formed on a substrate. With this structure, stable recording/reproducing operations can be realized within a high recording density region.

Herein, the soft magnetic layer means a layer made of a soft magnetic substance (i.e., a magnetic substance exhibiting a soft magnetic property) while the hard magnetic layer means a layer made of a hard magnetic substance (i.e., a magnetic substance exhibiting a hard magnetic property).

Generally, the hard magnetic layer is used as the perpendicular magnetic recording layer. In the double-layer perpendicular magnetic recording medium, the soft magnetic layer helps a magnetic head to record a signal in the perpendicular magnetic recording layer comprising the hard magnetic layer. In this connection, in order to constitute a suitable magnetic circuit through the magnetic head, the perpendicular magnetic recording layer, and the hard magnetic layer in the double-layer perpendicular magnetic recording medium, the soft magnetic layer must have a large thickness.

On the other hand, in order to improve the recording/reproducing characteristics of the magnetic recording medium at a high recording density, it is necessary to heat the substrate and to deposit the perpendicular magnetic recording layer on the substrate which has been heated. However, since the soft magnetic layer has the large thickness as described above, a substrate temperature drops during deposition of the perpendicular magnetic recording layer. As a consequence, the high recording density of the perpendicular magnetic recording disk is difficult to achieve.

For the purpose of solving such a problem, it is proposed to heat the substrate after forming the soft magnetic layer and before forming the perpendicular magnetic recording layer. In this method, however, the property of the soft magnetic layer is often degraded by heating. In this event, it is difficult to obtain a desired effect.

In the double-layer perpendicular magnetic recording medium, the soft magnetic layer must be thick as described above. This results in another problem that the production cost of the magnetic disk is increased.

Specifically, it is assumed to use a single-substrate/disk deposition apparatus (fixed target deposition apparatus), which is typically used in a magnetic disk production process. In this event, in order to obtain a suitable thickness of the soft magnetic layer, it is required to perform deposition by the use of a plurality of deposition apparatus connected in series or by the use of a large number of deposition chambers connected to one another because the thickness of the soft magnetic layer is large. Therefore, an increased number of steps and an increased amount of materials become necessary.

On the other hand, an in-plane magnetic recording medium widely used at present can be produced by the use of a single deposition apparatus. Therefore, the production cost of the perpendicular magnetic recording medium becomes extremely high as compared with the production cost of the in-plane magnetic recording medium. For this reason, market penetration of the perpendicular magnetic recording disk is prevented.

SUMMARY OF THE INVENTION

It is therefore an object of this invention to provide a disk substrate for a perpendicular magnetic recording medium, which enables production of an inexpensive and stable perpendicular magnetic recording disk having a high recording density.

It is another object of this invention to provide a perpendicular magnetic recording disk manufactured by the use of the above-mentioned disk substrate.

It is still another object of this invention to provide methods of manufacturing the above-mentioned disk substrate and the above-mentioned disk.

In order to solve the aforementioned problems, the present inventors have enthusiastically studied and, as a result, this invention has been completed.

According to a first aspect of this invention, there is provided a disk substrate for a perpendicular magnetic recording medium, which comprises a disk base member, a soft magnetic layer formed on the disk base member, and a protection layer formed on the soft magnetic layer.

According to a second aspect of this invention, the protection layer in the disk substrate is an amorphous layer.

According to a third aspect of this invention, the protection layer in the disk substrate is made of a non-magnetic substance.

According to a fourth aspect of this invention, the protection layer in the disk substrate is a carbon layer.

According to a fifth aspect of this invention, the disk base member in the disk substrate is made of glass.

According to a sixth aspect of this invention, the disk base member in the disk substrate has a principal surface provided with a texture for giving magnetic anisotropy to the soft magnetic layer.

According to a seventh aspect of this invention, there is provided a perpendicular magnetic recording disk comprising the above-mentioned disk substrate and at least a perpendicular magnetic recording layer formed thereon.

According to an eighth aspect of this invention, there is provided a method of manufacturing a disk substrate for a perpendicular magnetic recording medium, comprising the steps of depositing a soft magnetic layer on a disk base member by sputtering, and depositing a protection layer on the soft magnetic layer by sputtering.

According to a ninth aspect of this invention, there is provided a method of manufacturing a perpendicular magnetic recording disk comprising the steps of heating the above-mentioned disk substrate, and depositing at least a perpendicular magnetic recording layer on the disk substrate.

According to this invention, the disk substrate for a perpendicular magnetic recording medium (hereinafter, may be simply referred to as the disk substrate) comprises at least the soft magnetic layer and the protection layer formed on the disk base member in this order can be obtained. Therefore, the disk substrate can be heated without degradation of the property of the soft magnetic layer. As a result, the property of the perpendicular magnetic recording layer deposited on the disk substrate can be improved.

Further, according to this invention, the disk substrate itself comprises the soft magnetic layer. Therefore, in the production process of the perpendicular magnetic recording disk, it is unnecessary to deposit another soft magnetic layer on the disk substrate. Even in case where the soft magnetic layer is deposited on the disk substrate, the soft magnetic layer can be reduced in thickness. As a consequence, the production cost of the perpendicular magnetic recording disk can be suppressed. Thus, it is possible to separate the substrate production step and the magnetic disk production step. For example, by carrying out these steps in areas different in unit production cost, such as the electric power cost and the manpower cost, the total production cost can be suppressed.

Moreover, in the production step of the disk substrate, the soft magnetic layer is deposited by the use of a deposition method suitable for deposition of a thick film, for example, the in-line deposition method. Then, in the production step of the perpendicular magnetic recording disk, the perpendicular magnetic recording layer is deposited by the use of another deposition method suitable for precise deposition, for example, the single-substrate/disk deposition method or the fixed target deposition method. Thus, the total production cost can be decreased.

Preferably, the aforementioned protection layer is a heat-resistant protection layer capable of protecting the soft magnetic layer so as to prevent degradation in property of the soft magnetic layer as a result of heating of the disk substrate. For example, use is preferably made of a heat-resistant protection layer such as a carbon protection layer, a titanium dioxide protection layer, a titanium nitride protection layer, a silicon nitride protection layer, a $SiO_2$ protection layer, an $Al_2O_3$ protection layer, a BN protection layer, and a $ZrO_2$ protection layer. Among these layers, the carbon protection layer is preferable because the heat-resistance is superior and a smooth and flat thin film can be formed.

The protection layer is preferably an amorphous layer. The protection layer being the amorphous layer is advantageous in the following respects. In case where the perpendicular magnetic recording layer is formed after heating the disk substrate, magnetic grains of the perpendicular magnetic recording layer are reduced in size, resulting in an improvement of magnetic recording/reproducing characteristics. Further, in case where an underlayer for controlling the grains and the orientation of the perpendicular magnetic recording layer is formed on the disk substrate, grains of the underlayer can be reduced in size if the protection layer is the amorphous layer. In particular, in case where the above-mentioned underlayer is the amorphous layer, the protection layer being the amorphous layer is especially preferable.

In this invention, the protection layer is preferably made of a non-magnetic substance. By the use of the non-magnetic substance, a suitable magnetic circuit can be formed through a magnetic head, the perpendicular magnetic recording layer, and the soft magnetic layer, thereby contributing to a high recording density.

In this invention, the protection layer preferably has a thickness within the range of 0.5 nm-5 nm, more preferably within the range of 0.5 nm-3 nm. If the thickness of the protection layer is not smaller than 0.5 nm, a uniform film can be obtained so as to exhibit a sufficient protection function. If the thickness is not greater than 5 nm, a suitable magnetic circuit can be formed between the perpendicular magnetic recording layer and the soft magnetic layer because the distance between the soft magnetic layer and the perpendicular magnetic recording layer is small.

In this invention, no specific restriction is imposed upon the soft magnetic layer as long as the soft magnetic layer is formed of a magnetic substance exhibiting the soft magnetic property. However, as the magnetic properties, the coercive force (Hc) preferably falls within the range of 0.01-80 Oe (oersted), more preferably within the range of 0.01-50 Oe and the saturation magnetic flux density (Bs) preferably falls within the range of 500-1920 emu/cc.

As a material of the soft magnetic layer, a Fe-based soft magnetic material, a Co-based soft magnetic material, or the like may be used. For example, use may be made of a Fe-based soft magnetic material such as a FeTaC-based alloy, a FeTaN-based alloy, a FeNi-based alloy, a FeCoB-based alloy, and a FeCo-based alloy, a Co-based soft magnetic material such as a CoTaZr-based alloy and a CoNbZr-based alloy, or a FeCo-based alloy soft magnetic material.

The Fe-based soft magnetic material is suitable because the saturation magnetic flux density (Bs) is high. However, this material is low in corrosion resistance and, therefore, the property of the soft magnetic layer tends to be degraded by heating. However, according to this invention, the deterioration of the soft magnetic layer caused by heating can be avoided so that a high saturation magnetic flux density (Bs) is assured: Thus, in this invention, the Fe-based soft magnetic material can be advantageously used.

In this invention, in case where the protection layer is an amorphous layer, it is particularly preferable that the soft magnetic layer is an amorphous layer also.

In this invention, the thickness of the soft magnetic layer preferably falls within the range of 30-1000 nm, more preferably within the range of 50-300 nm. If the thickness is not smaller than 30 nm, a suitable magnetic circuit can be formed through the magnetic head, the perpendicular magnetic recording layer, and the soft magnetic layer. If the thickness is not greater than 1000 nm, deposition by sputtering is easy without increasing the surface roughness.

In this invention, the aforementioned disk base member is preferably made of glass. The disk base member made of glass is superior in heat resistance and, therefore, the heating temperature of the disk substrate can be elevated. As the glass for the disk base member, use may be made of aluminosilicate glass, aluminoborosilicate glass, soda lime glass, or the like. Among others, the aluminosilicate glass is suitably used. Alternatively, it is possible to use amorphous glass or crystallized glass. In case where the soft magnetic layer is an amorphous layer, the disk base member is preferably made of the amorphous glass. Further, use of chemically strengthened glass is preferable because a high rigidity can be obtained.

The disk base member is preferably made of a non-magnetic substance. By the use of the disk base member made of the non-magnetic substance, a suitable magnetic circuit can be formed through the magnetic head, the perpendicular magnetic recording layer, and the soft magnetic layer. As a consequence, a high recording density can be realized.

In this invention, the disk base member preferably has a principal surface provided with a texture for giving magnetic anisotropy to the soft magnetic layer. Given the anisotropy such that a hard magnetization axis of the soft magnetic layer is orientated in a disk circumferential direction, a suitable magnetic circuit can be formed through the magnetic head, the perpendicular magnetic recording layer, and the soft magnetic layer. The texture may have various shapes, such as a circular texture, an elliptical texture, a cross texture, or a radial texture. The circular texture is particularly preferable because the flying height of the magnetic head can be stabilized.

In this invention, the principal surface of the disk substrate is preferably formed into a smooth and flat surface having the surface roughness not greater than 6 nm in Rmax and not greater than 0.6 nm in Ra. By forming such a smooth and flat surface, the distance between the perpendicular magnetic recording layer and the soft magnetic layer can be kept constant. Therefore, a suitable magnetic circuit can be advantageously formed through the magnetic head, the perpendicular magnetic recording layer, and the soft magnetic layer.

In this invention, an adhesion layer is preferably formed between the disk base member and the soft magnetic layer. By forming the adhesion layer, the adhesiveness between the disk base member and the soft magnetic layer can be improved to thereby prevent the soft magnetic layer from being peeled off. As a material of the adhesion layer, for example, a material containing Ti can be used. From the practical point of view, the thickness of the adhesion layer preferably falls within the range of 1-50 nm.

As a method of manufacturing a disk substrate according to this invention, the soft magnetic layer and the protection layer are preferably deposited by sputtering. In particular, DC magnetron sputtering is preferable because uniform deposition can be carried out. From the aforementioned point of view, the in-line deposition method is preferably used.

In this invention, a perpendicular magnetic recording disk comprising a disk substrate according to this invention and at least a perpendicular magnetic recording layer formed thereon is provided. As the perpendicular magnetic recording layer, a Co-based perpendicular magnetic recording layer is preferable. For example, use may be made of a CoPt-based perpendicular magnetic recording layer or a CoCrPt-based perpendicular magnetic recording layer, or the like. If a FePt-based perpendicular magnetic recording layer is used, a higher recording density can be obtained.

The underlayer for controlling the grain or the orientation of the perpendicular magnetic recording layer is preferably formed between the disk substrate and the perpendicular magnetic recording layer. In case where the underlayer is formed, if the protection layer is the amorphous layer, the underlayer is preferably the amorphous layer also. With this structure, the grains of the perpendicular magnetic recording layer can be further reduced in size.

In the perpendicular magnetic recording disk according to this invention, a medium protection layer is preferably formed on the perpendicular magnetic recording layer. The medium protection layer is a protection layer for protecting the perpendicular magnetic recording layer from the impact of the magnetic head.

As a method of manufacturing a perpendicular magnetic recording disk according to this invention, it is preferable to heat the above-mentioned disk substrate and to deposit at least a perpendicular magnetic recording layer on the substrate which has been heated. By the above-mentioned method, recording/reproducing operations can be carried out to/from the perpendicular magnetic recording layer at a high recording density. The heating temperature of the substrate is selected within such a range that the effect of this invention is not lost. For example, the substrate is preferably heated at a temperature within the range of 100-500° C.

The perpendicular magnetic recording layer is preferably deposited by sputtering, particularly, DC magnetron sputtering. As mentioned above, it is desirable to use the single-substrate/disk deposition method or the fixed target deposition method.

DESCRIPTION OF THE PREFERRED EMBODIMENT

Figure 1:
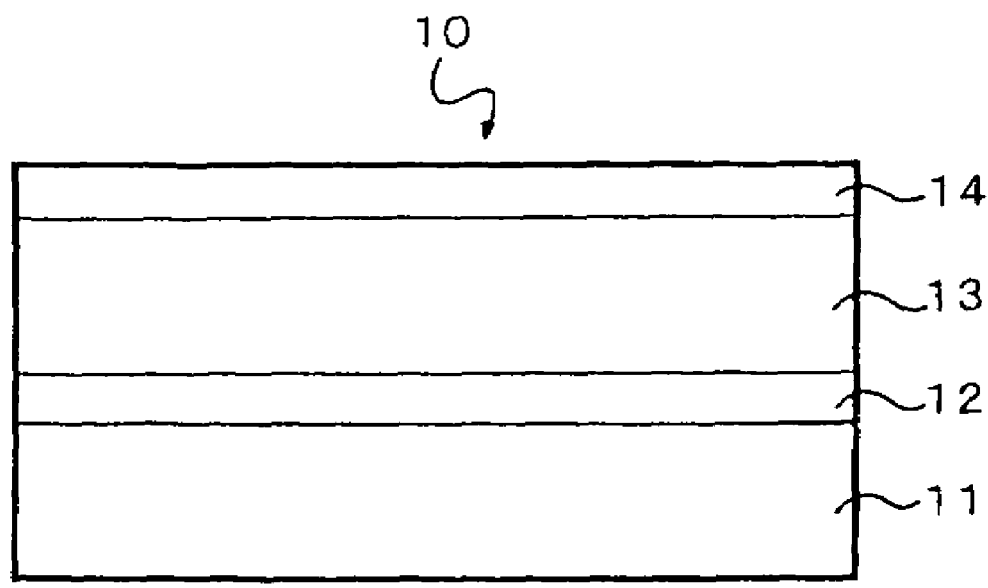
FIG. 1 is a vertical sectional view showing a disk substrate for a perpendicular magnetic recording medium according to this invention.

Now, description will be made of this invention with reference to the drawing.

Referring to FIG. 1, a disk substrate 10 for a perpendicular magnetic recording medium (hereinafter, will simply be referred to as a disk substrate 10) according to one embodiment of this invention comprises a disk base member 11, an adhesion layer 12 formed on the disk base member 11, a soft magnetic layer 13 formed on the adhesion layer 12, and a protection layer 14 formed on the soft magnetic layer 13.

Figure 2:
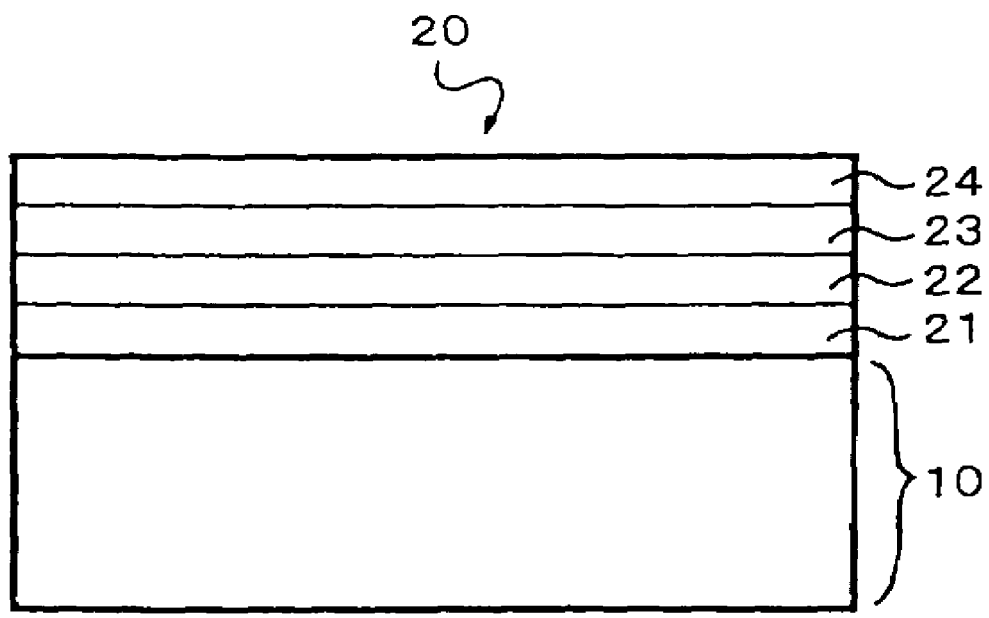
FIG. 2 is a vertical sectional view showing a perpendicular magnetic recording disk according to this invention.

Referring to FIG. 2, a perpendicular magnetic recording disk 20 according to one embodiment of this invention comprises the disk substrate 10 illustrated in FIG. 1, an underlayer 21 formed on the disk substrate 10, a perpendicular magnetic recording layer 22 formed on the underlayer 21, a medium protection layer 23 formed on the perpendicular magnetic recording layer 22, and a lubrication layer 24 formed on the medium protection layer 23.

Hereinafter, this invention will be explained in detail with reference FIGS. 1 and 2 in conjunction with several specific examples and a comparative example.

FIRST EXAMPLE

A glass disk was produced by forming amorphous aluminosilicate glass into a disc shape by direct pressing. The glass disk was successively subjected to grinding, polishing, and chemical strengthening to obtain the smooth and flat non-magnetic disk base member 11 comprising a chemically strengthened glass disk. The surface roughness of the principal surface of the disk base member was measured by the use of an AFM (atomic force microscope). As a result, the principal surface had a smooth and flat surface profile having Rmax of 4.8 nm and Ra of 0.42 nm. It is noted here that Rmax (maximum roughness) and Ra (average roughness) are surface roughness parameters specified by JIS (Japanese Industry Standard).

By the use of an in-line deposition apparatus which has been evacuated, the adhesion layer 12, the soft magnetic layer 13, and the protection layer 14 were successively deposited on the above-mentioned disk base member 11 in an Ar atmosphere by DC magnetron sputtering to produce the disk substrate 10.

The adhesion layer 12 was deposited as a Ti layer having a thickness of 25 nm by the use of a Ti target. The soft magnetic layer 13 was deposited as an amorphous FeTaC (Fe: 78 at %, Ta: 8 at %, C: 14 at %) layer having a thickness of 300 nm by the use of a FeTaC target. The protection layer 14 was deposited as a non-magnetic amorphous carbon layer having a thickness of 1 nm by the use of a carbon target. Alternatively, the protection layer 14 may be deposited as a hydrogenated carbon layer by mixing a hydrogen gas into the Ar atmosphere.

The disk substrate 10 with the adhesion layer 12, the soft magnetic layer 13, and the protection layer 14 deposited on the disk base member 11 was taken out from the deposition apparatus and was located in the air atmosphere.

Through the aforementioned production steps, the disk substrate 10 was obtained.

The surface roughness of the disk substrate 10 obtained as mentioned above was measured in the manner similar to the measurement for the disk base member. As a result, the disk substrate 10 had a smooth and flat surface profile having Rmax of 5.1 nm and Ra of 0.48 nm. The magnetic properties of the disk substrate 10 were measured by the use of a VSM (vibrating sample magnetometer). As a result, the coercive force (Hc) was equal to 2 Oe while the saturation magnetic flux density (Bs) was equal to 810 emu/cc, thus exhibiting suitable magnetic properties.

SECOND EXAMPLE

The perpendicular magnetic recording disk 20 was manufactured by the use of the disk substrate 10 obtained in the first example.

Specifically, on the disk substrate 10 which has been heated, the underlayer 21, the perpendicular magnetic recording layer 22, and the medium protection layer 23 were successively deposited by DC magnetron sputtering in the Ar atmosphere by the use of a single-substrate/disk deposition apparatus or a fixed target deposition apparatus which has been evacuated.

The disk substrate 10 was heated by holding the disk substrate 10 at 350° C. for 10 seconds in vacuum. On the disk substrate 10 after heated, the underlayer 21 made of amorphous NiTa (Ni: 45 at %, Ta: 55 at %) was deposited to the thickness of 10 nm by sputtering using a NiTa target. Subsequently, the perpendicular magnetic recording layer 22 having an hcp crystal structure and a thickness of 20 nm was deposited by sputtering using a CoCrPt alloy target as a hard magnetic substance. The perpendicular magnetic recording layer had a composition of Co: 62 at %, Cr: 20 at %, and Pt: 18 at %. Next, by using a mixed gas containing Ar and 30% hydrogen added thereto and a carbon target, sputtering was carried out to thereby form the medium protection layer 23 made of hydrogenated carbon. By using hydrogenated carbon as the medium protection layer 23, the hardness of the medium protection layer 23 was improved. Therefore, the perpendicular magnetic recording layer could be protected against the impact from a magnetic head. Thereafter, on the medium protection layer 23, the lubrication layer 24 made of perfluoro polyether (PFPE) was formed by dip coating. Herein, the lubrication layer 24 had a thickness of 1 nm.

Through aforementioned production steps, the perpendicular magnetic recording disk 20 was obtained.

The orientation of the perpendicular magnetic recording layer 22 of the perpendicular magnetic recording disk 20 obtained as mentioned above was analyzed by the X-ray diffraction analysis. As a result, the perpendicular magnetic recording layer 22 had the orientation perpendicular to the disk surface.

Moreover, the magnetic properties of the perpendicular magnetic recording disk 20 were evaluated by the VSM. As a result, the coercive force (Hc) was equal to 4800 Oe, the squareness ratio (residual magnetic flux density (Br)/saturation magnetic flux density (Bs)) was equal to 0.98, and the magnetization reversal nucleation field (Hn) was equal to −2000 Oe, thus exhibiting suitable magnetic properties.

It is noted here that the coercive force and the squareness ratio of the magnetic disk are preferably as high as possible while the magnetization reversal nucleation field is preferably as small as possible within a range smaller than zero.

The recording/reproducing characteristics (read/write characteristics) of the perpendicular magnetic recording disk 20 were measured. As a result, the S/N ratio was equal to 25.8 dB. Thus, a suitable result for the magnetic disk having a recording density of 100 Gbit/inch$^2$ or more was obtained.

Herein, the recording/reproducing characteristics (read/write characteristics) were measured in the following manner.

The recording/reproducing characteristics (read/write characteristics) were measured at a recording density of 780 kfci by the use of a R/W analyzer (GUZIK) and a magnetic head for the perpendicular magnetic recording system. The magnetic head had a SPT (single pole type) device on a recording side and a GMR (giant magnetoresistance) device on a reproducing side. As a result of the measurement, the flying height of the magnetic head was equal to 8 nm.

Comparative Example

The disk substrate was manufactured in the manner similar to the first example except that the protection layer 14 was not formed. Successively, the perpendicular magnetic recording disk was manufactured by the use of the disk substrate in the manner to the second example. Thus, the disk substrate in the comparative example was manufactured in the manner similar to the first example except that the protection layer 14 was not formed.

The perpendicular magnetic recording disk obtained as mentioned above was measured in the manner similar to the second example. As a result, the coercive force (Hc) was equal to 3900 Oe, the squarenesss ratio (residual magnetic flux density (Br)/saturation magnetic flux density (Bs)) was equal to 0.91, and the magnetization reversal nucleation field (Hn) was equal to −1500 Oe.

In the perpendicular magnetic recording disk in the comparative example, the coercive force was deteriorated by 900 Oe, the squareness ratio was deteriorated by 0.07, and the magnetization reversal nucleation field was degraded by 450 Oe, as compared with the second example.

Further, the recording/reproducing characteristics (read/write characteristics) were measured in the manner similar to the second example. As a result, the S/N ratio was equal to 22.3 dB and was deteriorated by 3.5 dB in the comparative example as compared with the second example.

In order to analyze the difference in characteristics between the perpendicular magnetic recording disks in the second example and in the comparative example, both of the disks were subjected to the cross section analysis by the use of a TEM (Transmission Electron Microscope). As a result, in the second example, no abnormality was observed in the soft magnetic layer 13 of the disk substrate. On the other hand, in the comparative example, deterioration, which might be caused by oxidization, was observed on the surface of the soft magnetic layer.

According to the present inventors' study, it is considered that, in the comparative example, the soft magnetic property of the surface portion of the soft magnetic layer was degraded by oxidization and that an oxidized substance formed on the surface of the soft magnetic layer disturbed the crystallinity and the orientation of the perpendicular magnetic recording layer, thereby deteriorating the characteristics of the perpendicular magnetic recording disk.

On the other hand, according to this invention, it is considered that the heat-resistant protection layer formed on the substrate served to prevent the soft magnetic layer from being oxidized and, therefore, a high recording density could be realized without degradation in soft magnetic property.

THIRD EXAMPLE

In a third example, a disk substrate for a perpendicular magnetic recording medium was similar to that in the first example except that the disk base member 11 had a principal surface provided with a texture.

The texture serves to give magnetic anisotropy to the soft magnetic layer. Given the magnetic anisotropy, the hard magnetization axis of the soft magnetic layer is oriented in the flying/running direction of the magnetic head, namely, in the disk circumferential direction.

Specifically, circular stripe grooves were formed on the principal surface of the disk base member 11.

The texture was formed by subjecting the disk base member 11 to tape texturing by the use of a single-substrate tape texturing apparatus and diamond slurry. The disk substrate in the third example was similar to that of the first example except that the texture was formed on the principal surface of the disk substrate.

The surface roughness of the disk substrate 10 thus obtained was measured in the similar manner. As a result, the circular texture was observed and the disk substrate 10 had a smooth and flat surface profile having Rmax of 5.2 nm and Ra of 0.51 nm.

The magnetic properties of the disk substrate 10 were measured by the use of a VSM (vibrating sample magnetometer). As a result, the magnetic anisotropy on the order of 10 Oe was produced in the anisotropic magnetic field in the circumferential direction.

By using the above-mentioned disk substrate, a perpendicular magnetic recording disk was manufactured in the manner similar to the second example and the characteristics were measured. As a result, the magnetic properties were equivalent to those of the second example. However, the S/N ratio was equal to 26.2 dB and was improved by 0.4 dB as compared with the second example.

According to this invention, the disk substrate and the perpendicular magnetic recording disk each having an excellent soft magnetic property can be obtained at a low cost. Therefore, it is possible to provide an inexpensive perpendicular magnetic recording disk having a high recording density.

While this invention has thus far been disclosed in conjunction with a few preferred embodiments or examples thereof, it will be readily possible for those skilled in the art to put this invention into practice in various other manners.

What is claimed is:

1. A disk substrate for a perpendicular magnetic recording medium, which comprises:
   a disk base member;
   a soft magnetic layer formed on the disk base member; and
   a protection layer formed on a surface of the soft magnetic layer, wherein;
      the protection layer is an amorphous layer, and
      the protection layer being operative to reduce a grain size of an underlayer to be formed on the disk substrate, the underlayer controlling grain and orientation of a perpendicular magnetic recording layer subsequently formed on the underlayer, wherein, the protection layer is made of a non-magnetic substance, and wherein: the protection layer is a carbon layer.

2. A disk substrate as claimed in claim 1, wherein: the disk base member is made of glass.

3. A disk substrate as claimed in claim 1, wherein: the disk base member has a principal surface provided with a texture for giving magnetic anisotropy to the soft magnetic layer.

4. A perpendicular magnetic recording disk comprising: the disk substrate claimed in claim 1; and
   at least a perpendicular magnetic recording layer formed on the disk substrate.

5. A disk as claimed claim 1, wherein: the carbon comprises an amorphous carbon.

6. A disk substrate as claimed in claim 1, wherein the carbon comprises hydrogenated carbon.

* * * * *